United States Patent
Wang

(10) Patent No.: US 11,141,867 B2
(45) Date of Patent: Oct. 12, 2021

(54) ROBOTIC DEXTEROUS HAND

(71) Applicant: SHENZHEN DORABOT ROBOTICS CO., LTD., Shenzhen (CN)

(72) Inventor: Zhi-Kang Wang, Shenzhen (CN)

( * ) Notice: Subject to any disclaimer, the term of this patent is extended or adjusted under 35 U.S.C. 154(b) by 591 days.

(21) Appl. No.: 16/080,732

(22) PCT Filed: Oct. 28, 2016

(86) PCT No.: PCT/CN2016/103856
§ 371 (c)(1),
(2) Date: Aug. 29, 2018

(87) PCT Pub. No.: WO2018/076304
PCT Pub. Date: May 3, 2018

(65) Prior Publication Data
US 2021/0187757 A1 Jun. 24, 2021

(51) Int. Cl.
*B25J 15/10* (2006.01)
*B25J 15/02* (2006.01)
*B25J 19/02* (2006.01)
*B25J 15/00* (2006.01)
*B25J 15/04* (2006.01)

(52) U.S. Cl.
CPC ......... *B25J 15/103* (2013.01); *B25J 15/0061* (2013.01); *B25J 15/0233* (2013.01); *B25J 15/0475* (2013.01); *B25J 19/021* (2013.01)

(58) Field of Classification Search
CPC .................. B25J 15/0009; B25J 15/0061; B25J 15/0233; B25J 15/0475; B25J 15/08; B25J 15/10; B25J 15/103; B25J 19/021; B25J 19/023
See application file for complete search history.

(56) References Cited

U.S. PATENT DOCUMENTS

| | | | | |
|---|---|---|---|---|
| 3,694,021 A * | 9/1972 | Mullen | ................ | B25J 15/0009 294/106 |
| 8,100,451 B2 * | 1/2012 | Okuda | ................ | B25J 15/0009 294/106 |
| 8,597,370 B2 * | 12/2013 | Wisse | ................ | B25J 15/0009 623/64 |
| 10,786,907 B2 * | 9/2020 | Wang | ................ | B25J 9/0015 |
| 2012/0013139 A1 * | 1/2012 | Torres-Jara | ........... | B25J 13/084 294/110.1 |
| 2014/0334907 A1 * | 11/2014 | Piccioni | ............... | B25J 11/0025 414/737 |

* cited by examiner

*Primary Examiner* — Dean J Kramer
(74) *Attorney, Agent, or Firm* — ZANIP

(57) ABSTRACT

The invention discloses a robotic dexterous hand including a plurality of finger mechanisms, the finger mechanisms comprises: an actuator; a connecting element with one end fixed to the actuator; a plurality of fingers including a plurality of knuckles, the knuckle includes a fixed knuckle positioned at the other end of the connecting element, the fixed knuckles are arranged in parallel and jointly form a palm of the robotic dexterous hand; wherein the actuator drives the flexion of the fingers to perform the gripping of a target object. The fingers and the palm are built from the multiple knuckles having a same structure. Design is required merely for the structure of a single knuckle, the need for discretely designing the structure of the fingers and that of the palm is obviated, thus greatly reducing the types of components, at the same time, simplifying the structure, and favoring the production and management.

17 Claims, 8 Drawing Sheets

ROBOTIC DEXTEROUS HAND

CROSS REFERENCE TO RELATED APPLICATIONS

This application is a national stage filing under section 371 of International Application No. PCT/CN2016/103856 filed on Oct. 28, 2016, which is published in Chinese on May 3, 2018 as WO2018/076304, the disclosure of which are hereby incorporated by reference in their entirety.

FIELD OF THE INVENTION

The invention pertains to the field of robotics, and in particularly relates to a robotic dexterous hand.

BACKGROUND OF THE INVENTION

The robotic dexterous hand technology plays an important role in the field of robotics, domestic and foreign scholars have done a lot of researches on robotic dexterous hand technology and produce numbers of studies after a long-time development, such as HTI/DLR hand, NASA hand, SHADOW hand, etc. The related technologies mainly focus on the mechanical structure, driving, sensing and integration, etc. For example, the SHADOW hand uses five fingers controlled by pneumatic muscles; HIT/DLR and NASA hands are driven by multi-motors, the driving element is arranged on the finger joints and the palm.

The palm and the fingers of the robotic dexterous hand in the prior art are usually separately designed, the structure of the fingers and the palm are so complex resulting numerous components. As different dies and molds are needed to produce different components, it is not only inconvenient for inventory management with higher cost, but also not easy for assembly and maintenance, the practicality and applicability of the dexterous hands are greatly reduced.

SUMMARY OF THE INVENTION

The purpose of the invention is to solve the problems in the prior art, including the complex structure of the robotic dexterous hand with numerous components and inconvenience for manufacture management and assembly.

The present invention is provided to solve the above problems.

In accordance with an aspect of the embodiment, there is provided a robotic dexterous hand. The robotic dexterous hand includes: a plurality of finger mechanisms, each of the finger mechanisms comprises: an actuator; a connecting element, one end of the connecting element is fixed to the actuator; a plurality of fingers, the finger includes a plurality of knuckles which are successively and rotatably connected head-to-tail, the knuckle includes a fixed knuckle positioned at the other end of the connecting element, the fixed knuckles of the fingers are arranged in parallel and jointly form a palm of the robotic dexterous hand; wherein the actuator drives the flexion of the fingers to perform the gripping of a target object.

The fingers and the palm of the robotic dexterous hand are built from the multiple knuckles having a same structure. Hence, design is required merely for the structure of a single knuckle, the need for discretely designing the structure of the fingers and that of the palm is obviated, thus greatly reducing the types of components of the robotic dexterous hand, at the same time, simplifying the structure of the robotic dexterous hand, and favoring the production and management.

Meanwhile, as the knuckle is a modular component, the users can construct their own fingers of different quantities and their own fingers consisting of different quantities of the knuckles based on their own needs, different numbers and different length of the fingers are also needed to meet various requirements for various objects, which greatly increases the flexibility of the configuration of the robotic dexterous hand to meet the needs of different users.

BRIEF DESCRIPTION OF THE DRAWINGS

The invention will be described with reference to the accompanying drawings. These and/or other aspects and advantages of the invention will become apparent and more readily appreciated from the following description of the embodiments, taken in conjunction with the accompanying drawings.

DETAILED DESCRIPTION OF THE INVENTION

The invention will be further described below in details with reference to the figures and embodiments.

Figure 1:
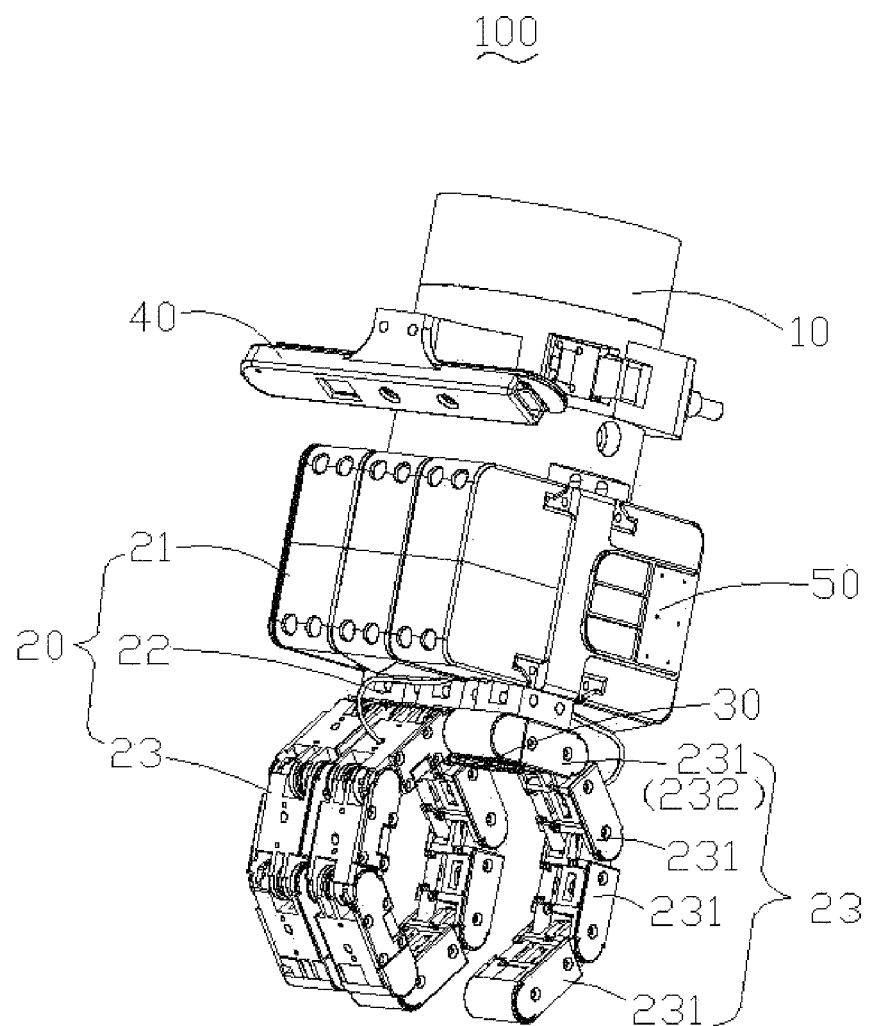
FIG. 1 is a perspective view of the robotic dexterous hand according to one embodiment of the present invention.
Figure 2:
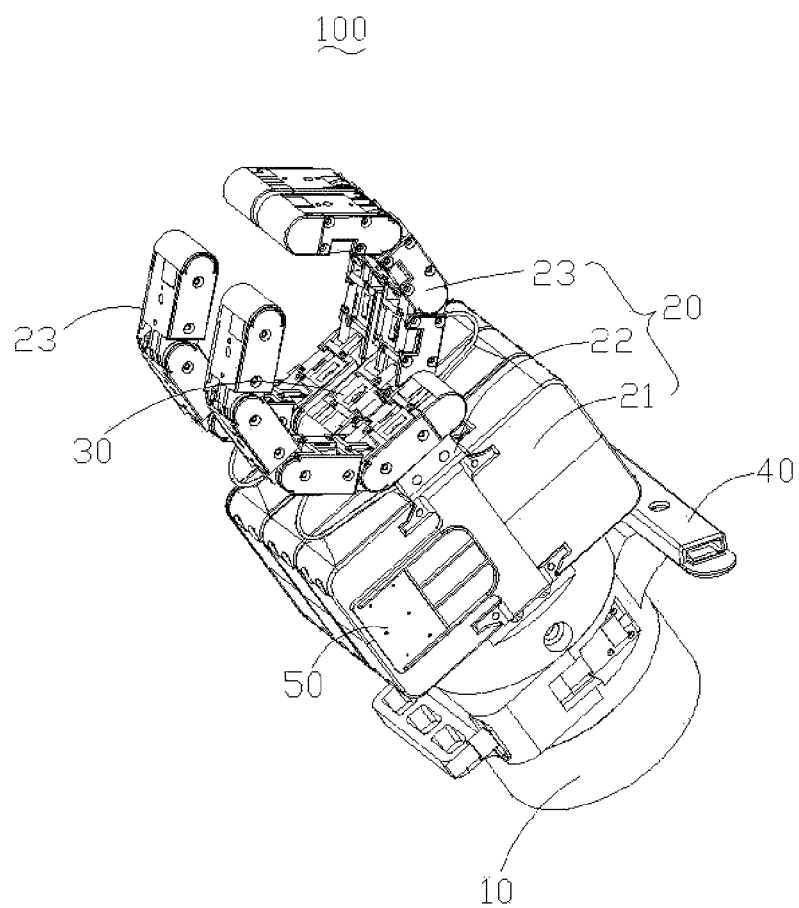
FIG. 2 is a perspective view of the robotic dexterous hand shown in FIG. 1 viewed from another direction.

Referring generally to FIGS. 1 and 2, the robotic dexterous hand 100 according to a preferred embodiment of the present invention includes a plurality of finger mechanisms 20. Each of the finger mechanisms 20 includes an actuator 21, a plurality of fingers 23 and a connecting element 22 connected between the actuator 21 and the finger 23. The actuator 21 drives the flexion of the fingers 23 to perform the gripping of a target object.

Each of the fingers 23 includes a plurality of knuckles 232 which are successively and rotatably connected head-to-tail. The knuckle 231 of the finger 23 includes a fixed knuckle 232 positioned at the other end of the connecting element 22. In the embodiment of the present invention, the fixed knuckle 232 is located on one end of the finger 23. The fixed knuckle 232 of each finger 23 is secured to the connecting element 22 during the process of installing, the fixed knuckles 232 of the fingers 23 are arranged in parallel and jointly form a palm 30 of the robotic dexterous hand 100.

In other words, the fingers 23 and the palm 30 of the robotic dexterous hand 100 are built from the multiple knuckles 231 having a same structure. Hence, design is required merely for the structure of a single knuckle 231, the need for discretely designing the structure of the fingers 23 and that of the palm 30 is obviated, thus greatly reducing the types of components of the robotic dexterous hand 100, at the same time, simplifying the structure of the robotic dexterous hand 100, and favoring the production and management of the components.

Meanwhile, as the knuckle 231 is a modular component, the users can construct their own fingers 23 of different quantities and their own fingers 23 consisting of different quantities of the knuckles 231 based on their own needs, different numbers and different length of the fingers 23 are also needed to meet various requirements for various objects, which greatly increases the flexibility of the configuration of the robotic dexterous hand 100 to meet the needs of different users.

In the embodiment of the present invention, the robotic dexterous hand 100 includes three finger mechanisms 20, one of the finger mechanisms 20 includes two fingers 23, the two fingers 23 extend separately from two ends of the fixed knuckles 232. Each of the other two finger mechanisms 20 includes only one finger 23 extending from one end of the fixed knuckles 232.

In other embodiment, the users can deploy different quantities of finger mechanisms 20 and the corresponding quantities of fingers 23 as required. For example, the robotic dexterous hand 100 includes three finger mechanisms 20 in the present embodiment, five or six fingers 23 are alternatively adopted in other embodiments. The fingers 23 extend separately from both ends of two fixed knuckles 232 when the number of the fingers 23 is five, the finger 23 extends from one end of another fixed knuckle 232. Two fingers 23 extend from two ends of each fixed knuckle 232 when there are six fingers 23.

In other words, the users can add more knuckles 231 extending from the fixed knuckles 232 of the present invention as required to form an additional finger 23, which greatly increases the applicability of the fingers arrangement of the robotic dexterous hand 100.

In the present embodiment, the number of knuckles 231 of each finger 23 is three. In other alternative embodiment, the users can deploy different quantities of knuckles 231 to lengthen or shorten each finger 22, for example, one more knuckle 231 can be added to each finger 23, or one more knuckle 231 can be added to only one finger 23.

As described above, the finger 23 and the palm 30 are made up of modular knuckles 231 according to the robotic dexterous hand 100 of the present invention, the users can configure different quantities of fingers 23, different length of fingers 23 and different sizes of palms 30 to meet various requirements, which greatly increases the applicability and the flexibility of the robotic dexterous hand 100.

Figure 3:
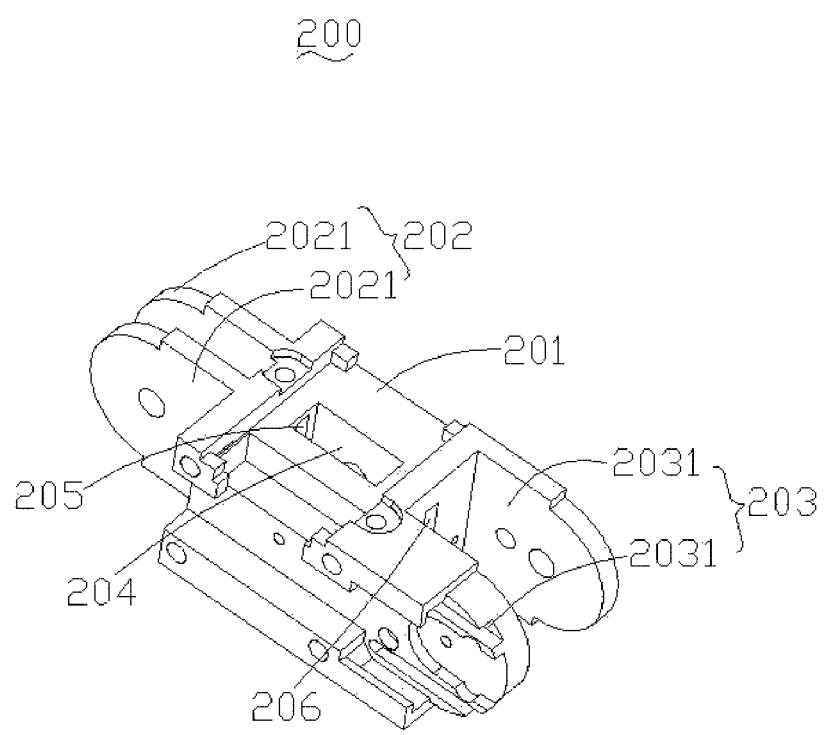
FIG. 3 is a perspective view of the base module of the knuckle shown in FIG. 1.

Along with FIG. 3, particularly, each knuckle 231 includes a base module 200. The base module 200 includes a main body 201, a first connecting portion 202 and a second connecting portion 203, the first connecting portion 202 and the second connecting portion 203 are defined on both ends of the main body 201. While assembling, the first connecting portion 202 of one of two adjacent knuckles 231 flexibly and rotatably articulates to the second connecting portion 203 of the other knuckle 231.

Figure 4:
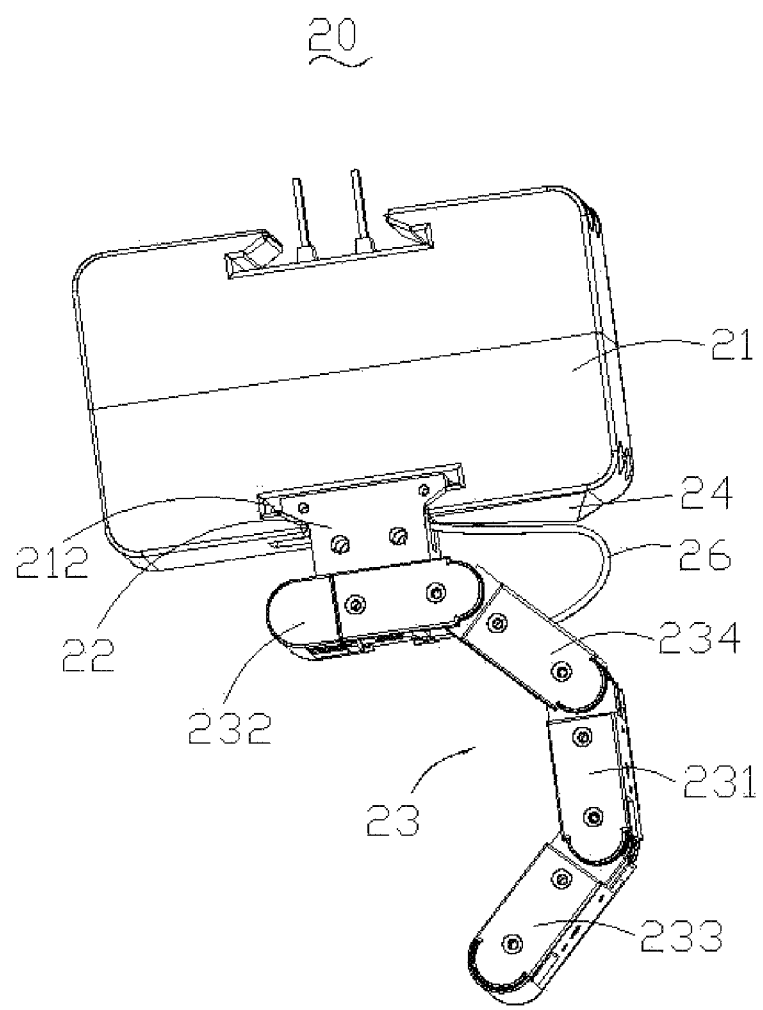
FIG. 4 is a perspective view of the finger mechanism shown in FIG. 1.
Figure 5:
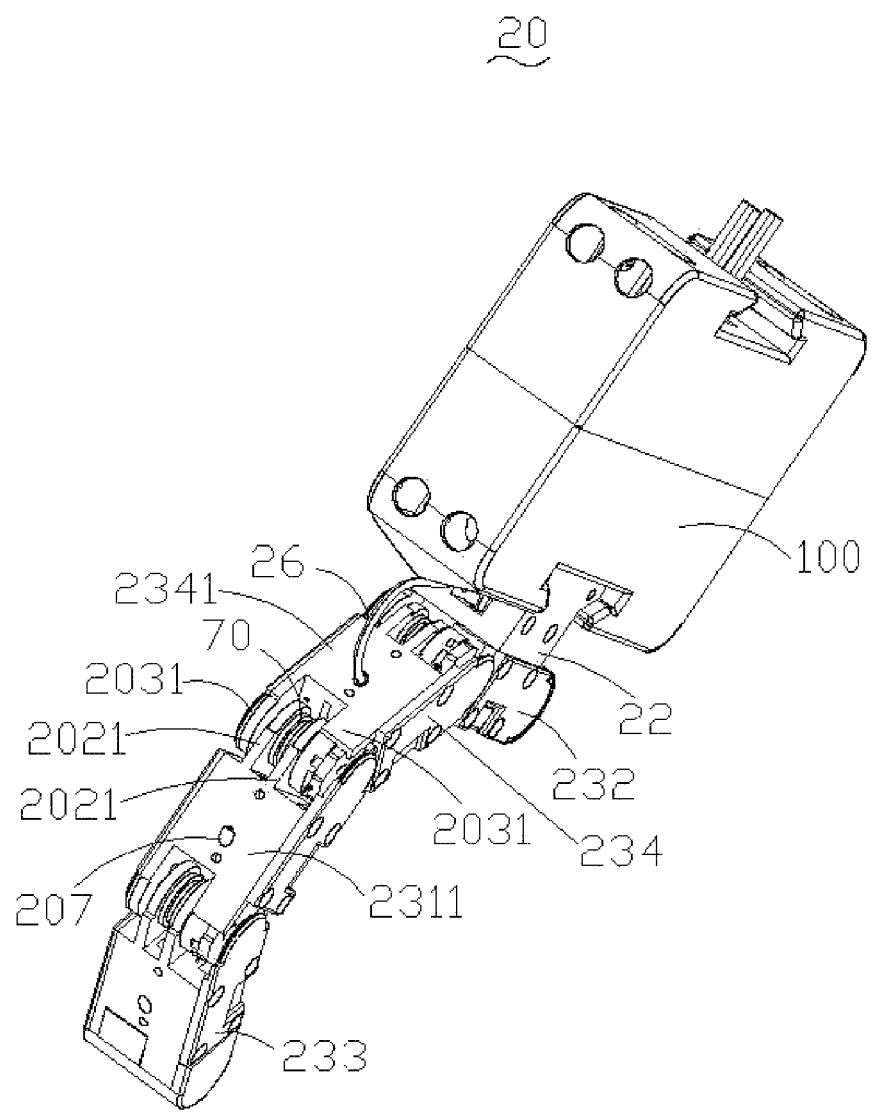
FIG. 5 is a perspective view of the finger mechanism shown in FIG. 4 viewed from another direction.
Figure 6:
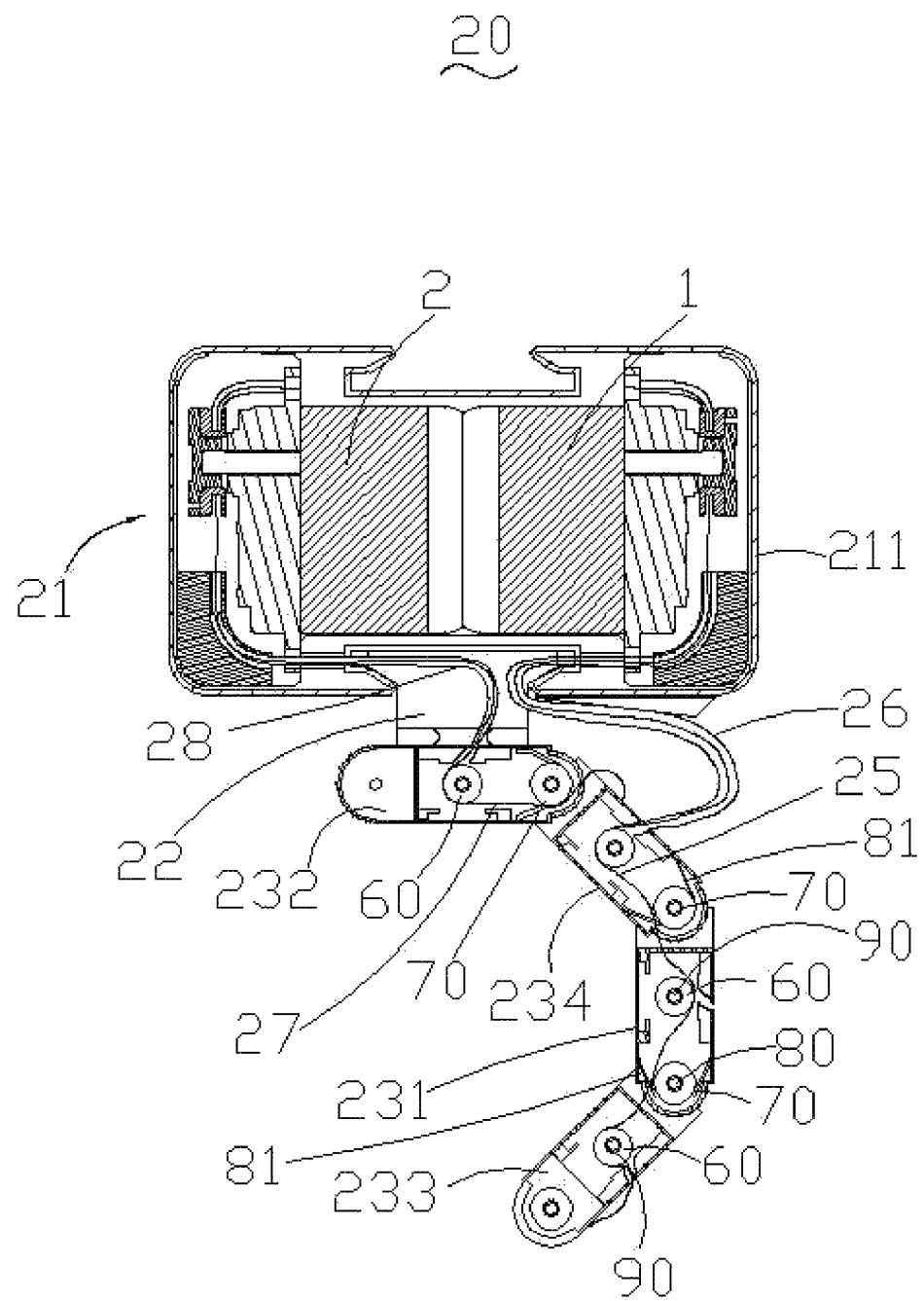
FIG. 6 is a cross-sectional view of the finger mechanism shown in FIG. 4.

Further, the first connecting portion 202 includes a pair of first extension beams 2021 spaced from each other, the first extension beams 2021 extend from one end of the main body 201. The second connecting portion 203 includes a pair of second extension beams 2031 spaced from each other, the second extension beams 2031 extend from the other end of the main body 201. As shown in FIGS. 4, 5 and 6, the first extension beams 2021 enter the space between the second extension beams 2031 of another knuckle 231, the first extension beams 2021 flexibly and rotatably articulate to the second extension beams 2031 by means of a first shaft 80 and a first spring 81. The first spring 81 could be a torsion spring or a tension spring.

In the present embodiment, the first spring 81 is a torsion spring.

Referring to FIG. 6, each actuator 21 includes a shell 211, a first servo 1 accommodated in the shell 211, the finger mechanism 20 further includes a first driven belt 25.

In the present embodiment, the knuckle 231 at the free end of the finger 23 is defined as a distal knuckle 233 for better understanding, the knuckle 231 adjacent to the fixed knuckle 232 is defined as a proximal knuckle 234. During the assembly, one end of the first driven belt 25 is fixed to the distal knuckle 233, the other end extends successively from the distal knuckle 233 along the other knuckles 231 connecting to the distal knuckle 233 until beyond the proximal knuckle 234, as shown in FIG. 5, the first driven belt 25 passes through the connecting element 22 into the shell 211 of the actuator 21 subsequently and connects with the first servo 1.

The first servo 1 drives the first driven belt 25 to draw all the knuckles 231 between the proximal knuckle 234 and the distal knuckle 233 to link with the distal knuckle 234 when the robotic dexterous hand 100 is at work.

More specifically, as shown in FIG. 3, the main body 201 of the base module 200 is provided with a first accommodating space 204, a first hole 205 and a second hole 206, the first hole 205 and the second hole 206 both communicate with the first accommodating space 204.

Referring to FIGS. 5 and 6, a first pulley 60 is arranged in the first accommodating space 204, the first pulley 60 is rotatably connected with the main body 201 via a second shaft 90 when it is assembled. A second pulley 70 is defined between the first extension beams 2021 of one of two adjacent knuckles 231, the first shaft 80 passes through the second pulley 70. The following embodiment will illustrate one way of laying the first driven belt 25 with four knuckles 231 including the fixed knuckle 232, which is not intended to limit the layout of the present invention. The first driven belt 25 traverses the first pulley 60 located in the distal knuckle 233 in a first direction, then passes through the first hole 205 of the main body 201 of the distal knuckle 233, after traversing the second pulley 70 located between the distal knuckle 233 and the other knuckle 231 connecting with the distal knuckle 233 in the first direction, the first driven belt 25 enters the first accommodation space 204 of the main body 201 from the second hole 206 of the main body 201 of the other knuckle 231, the first driven belt 25 traverses the first pulley 60 of the other knuckle 231 in a second direction, then passes through the first hole 205 of the main body 201 of another knuckle 231, after traversing the second pulley 70 between the other knuckle 231 and the proximal knuckle 234, the first driven belt 25 enters the first accommodation space 205 of the main body 201 from the second hole 206 of the main body 201 of the proximal knuckle 234 and traverses the first pulley 60 located in the proximal knuckle 234 in the first direction. The proximal knuckle 234 is provided with an outlet 207 which the first driven belt 25 extends through until beyond the finger 23. The first driven belt 25 traverses all the knuckles 231 except the fixed knuckle 232 to enable the linkage of the knuckles 231. The first direction is opposite to the second direction.

The first driven belt 25 mentioned above is assembled in the direction from the distal knuckle 233 towards the proximal knuckle 234, it can be understood that the first driven belt 25 can be assembled in the direction from the proximal knuckle 234 towards the distal knuckle 233.

As an improvement of the present invention, the finger 23 further includes a first spring tube 26. One end of the first spring tube 26 is inserted into the proximal knuckle 234 when assembled, the other end of that passes through the connecting element 22 and enters the shell 211 of the actuator 21. The portion of the first driven belt 25 having the same path as the first spring tube 26 is received in the first spring tube 26. That is to say, the first spring tube 26 guides the extension path of the first driven belt 25, the first spring tube 26 provides a guiding path for the first driven belt 25 to guide the movement of the first driven belt 25, and it plays the role of replacing the pulley system to transmit power for a flexible driving.

Figure 7:
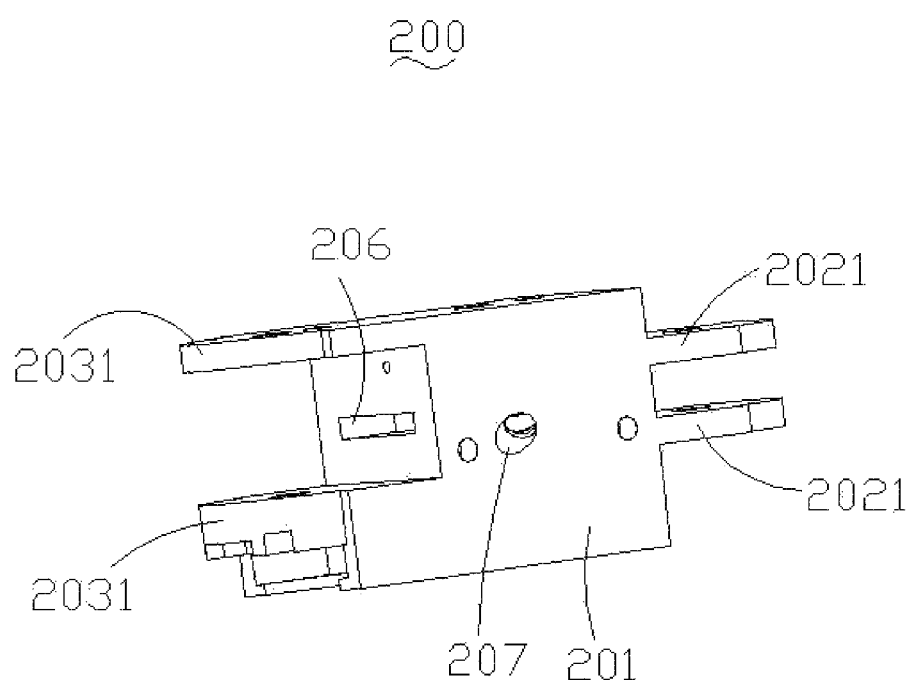
FIG. 7 is a perspective view of the base module shown in FIG. 3.

Further, as illustrated in FIG. 7, the main body 201 of each base module 200 is provided with the outlet 207, the outlet 207 communicates with the first accommodation space 204, the outlet 207 extends obliquely with respect to an outer case 2311 of the knuckle 231, the first spring tube 26 extends through the outlet 207 and enters the first accommodation space 204 of the proximal knuckle 234.

When the fingers 23 perform gripping, the actuator 21 pulls the first driven belt 25, at the same time, the first spring tube 26 and the first driven belt 25 are in friction with each other, the first spring tube 26 is in a strained state. The outlet 207 extends obliquely with respect to the outer case 2341 of the proximal knuckle 234, thus, the inclined outlet 207 provides a predetermined and reasonable angle for securing the first spring tub 26 so that the first spring tube 26 possess a reasonable curved posture in the space to reduce the additional resilience caused by the first spring tube 26 against the fingers 23 when the fingers 23 are stretched.

When the fingers 23 return, the actuator 21 drives the first driven belt 25 to loosen, the fingers 23 return to initial position under the driving of the first spring 81 located between the adjacent knuckles 231.

The robotic dexterous hand 100 of the present invention can effectively prevent the first spring tube 26 from counteracting against the knuckle 231 with larger elastic coefficient by setting the outlet 207 of the outer case 2311 of the knuckle 231 to be inclined, so the knuckle 231 can be successfully returned to its original position. At the same time, it can also effectively avoid the possible slippage of the first spring tube 26.

In the present embodiment, the first spring tube 26 and the outlet 207 are interference fitted, the first spring tube 26 and the outlet 207 are fixed by friction.

In the present embodiment, the center line of the outlet 207 is tangent to the first pulley 60 of the corresponding knuckle 231. In use, the first driven belt 25 is at the center of the first spring tube 26, which effectively reduces the resistance between the first driven belt 25 and the inner wall of the outlet 207, so that the knuckle 231 can perform the flexion successfully.

In the present embodiment, the portion of the first spring tube 26 coinciding with the actuator 21 is pre-embedded in the shell 211 of the actuator 21. The first spring tube 26 is pre-embedded in the shell 211 of the actuator 21, so that it effectively guides the extension path of the first driven belt 25, and it is also beneficial for the organization of the first driven belt 25 by the robotic dexterous hand 100, and improves the transmission efficiency by setting the curvature of the first spring tube 26 within the shell 211. The finger mechanism 20 further includes a guiding plate 24, the guiding plate 24 is defined on the exterior of the shell 211 of the actuator 21, which corresponds to the portion of the first spring tube 26 entering the shell 211 of the actuator 21. The outer surface of the guiding plate 24 is inclined with respect to the shell 211 of the actuator 21, the first spring tube 26 abuts against the outer surface of the guiding plate 24, releases the reaction force against the finger 23 in the oblique direction of the guide plate 24 and extends into the shell 211 of the actuator 21.

During the assembly, the first spring tube 26 passes through the outlet 207 and enters the actuator 21 via the guiding plate 24, the guiding plate 24 pushes the first spring tube 26 away from the actuator 21, so as to provide a larger bending space for the first spring tube 26 which allows the first spring tube 26 move smoothly with less frictional resistance when the knuckles 231 are unbent. At the same time, it can also effectively avoid the possible slippage of the first spring tube 26.

Figure 8:
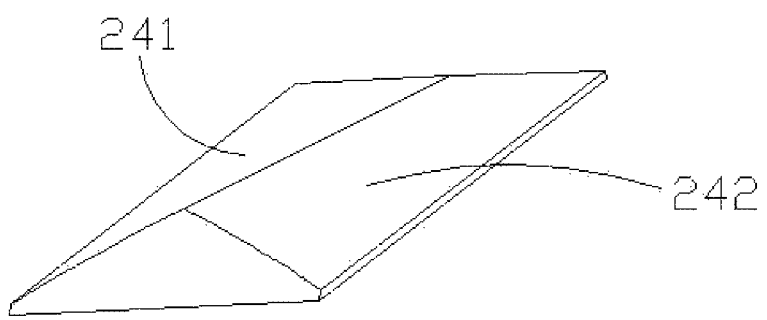
FIG. 8 is a perspective view of the guiding plate.

Referring to FIGS. 6 and 8 at the same time, practically, the guiding plate 24 includes a first inclined surface 241, the distance between the first inclined surface 241 and the corresponding shell 211 of the actuator 21 gradually decrease along the extension path of the first spring tube 26 into the actuator 21, the first spring tube 26 abuts against the first inclined surface 241.

In one condition, the first spring tube 26 is attached along the first inclined surface 241, a larger bending space is provided by means of the inclined angle produced by the first inclined surface 241, so that it allows the first spring tube 26 to move smoothly with less frictional resistance when the knuckles 231 are unbent.

In another embodiment of the present invention, the guiding plate 24 includes a first inclined surface 241 and a second inclined surface 242 intersecting with the first inclined surface 241, the distance between the first inclined surface 241 and the corresponding shell 211 of the actuator 21 and the distance between the second inclined surface 242 and the corresponding shell 211 of the actuator 21 gradually decrease along the extension path of the first spring tube 26 into the actuator 21, the first spring tube 26 abuts against the first inclined surface 241 or the second inclined surface 242. Due to the second inclined surface 242, an abutting space is provided for the first spring tube 26 in the direction vertical to the extension path as the first spring tube 26 extends into the actuator 21. That is to say, the first spring tube 26 can abut against the first inclined surface 241 or the second inclined surface 242, enough bending space is guaranteed regardless of either surface the first spring tube 26 abuts against according to the gripping gesture or other factors. When the first spring tube 26 directly abuts against the shell 211 of the actuator 21 and the fingers 23 perform some actions, such as stretching the fingers 23 towards the direction of the actuator 21, the operations of the fingers 23 may be affected as the force between the first spring tube 26 and the shell 211 counteracts against the fingers 23, as a result, the problem is solved. It can be understood that the users can adjust the leaning surface of the first spring tube 26 according to requirements.

As shown in FIG. 6, the actuator 21 further includes a second servo 2 defined in the shell 211, the finger mechanism 20 further includes a second driven belt 27, one end of the second driven belt 27 is fixed to the proximal knuckle 234, the other end passes through the fixed knuckle 232 and extends beyond the fixed knuckle 232, the second driven belt 27 passes through the connecting element 22 into the shell 211 of the actuator 21 subsequently and connects with the second servo 2, the second servo 2 drives the second driven belt 27 to draw the proximal knuckle 234 to move relative to the fixed knuckle 232.

Further, the finger mechanism 20 further includes a second spring tube 28, one end of the second spring tube 28 is inserted in to the outlet 207 of the fixed knuckle 232, the other end passes through the connecting element 22 and enters the shell 211 of the actuator 21, the portion of the second driven belt 27 having the same path as the second spring tube 28 is received in the second spring tube 28, the second spring tube 28 guides the extension path of the second driven belt 27.

The second spring tube 28 has the same function as the first spring tube 26, as the outlet 207 of the fixed knuckle 232 is inclined, the second spring tube 28 has enough space when the actuator 21 drives the second driven belt 27 to loosen, the second spring tube 28 can smoothly return to its original position under the action of its own elasticity.

Similarly, the portion of the second spring tube 28 coinciding with the actuator 21 is pre-embedded in the shell 211 of the actuator 21, so that it is beneficial for the organization of the second driven belt 27 by the robotic dexterous hand 100. The transmission efficiency is improved by setting the curvature of the second spring tube 28 within the shell 211.

In some embodiments, materials with less friction including but not limited to Poly tetra fluoroethylene (PTFE) can be disposed on the inner walls of the first spring tube 26 and the second spring tube 28, in order to solve the friction loss during transmission.

In the present embodiment, the actuator 21 is provided with a T-shape slot 212, the connecting element 22 is locked into the T-shape slot 212 and fixed with the actuator 21 as shown in FIG. 4. The T-shape slot 212 enables the users manually to assemble or disassemble the connecting element 22 and the actuator 21, thereby improves the convenience of the robotic dexterous hand 100.

Referring to FIGS. 1 and 2, as an improvement of the present invention, the robotic dexterous hand 100 further includes a vision sensing module 40. The vision sensing module 40 are positioned on the base 10. The robotic dexterous hand 100 performs the gripping of the object according to the identification and location by the vision sensing module.

As an improvement of the present invention, the robotic dexterous hand 100 further includes a suction mounting portion 50, the suction mounting portion 50 is positioned on one of the actuators 21 and used for mounting a sucker. The suction mounting portion 50 allows the robotic dexterous hand 100 to suck some objects that the fingers 23 are not easy to catch, thereby promoting the ability of the robotic dexterous hand 100 to grip the objects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A robotic dexterous hand, the robotic dexterous hand includes a plurality of finger mechanisms, each of the finger mechanisms comprising:
an actuator;
a connecting element, one end of the connecting element is fixed to the actuator;
at least one fingers, the finger includes a plurality of knuckles which are successively and rotatably connected head-to-tail, the knuckles include& a fixed knuckle positioned at the other end of the connecting element, the fixed knuckles of the fingers of the finger mechanisms are arranged in parallel and jointly form a palm of the robotic dexterous hand; wherein
the actuator drives the flexion of the fingers of the finger mechanisms to perform the gripping of a target object, wherein each of the knuckles includes a base module, the base module includes a main body, a first connecting portion and a second connecting portion, the first connecting portion and the second connecting portion are defined on both ends of the main body, the first connecting portion of one of two adjacent knuckles flexibly and rotatably articulates to the second connecting portion of the other knuckle.

2. The robotic dexterous hand as defined in claim 1, wherein the first connecting portion includes a pair of first extension beams spaced from each other, the first extension beams extend from one end of the main body, the second connecting portion includes a pair of second extension beams spaced from each other, the second extension beams extend from the other end of the main body, the pair of the first extension beams of one of two adjacent knuckles enter the space between the second extension beams of other knuckle, the first extension beams flexibly and rotatably articulate& to the second extension beams by means of a first shaft and a first spring.

3. The robotic dexterous hand as defined in claim 1, wherein the main body is provided with a first accommodating space, a first pulley is arranged in the first accommodating space, the first pulley is rotatably connected with the main body via a second shaft, a second pulley is defined between first extension beams of one of two adjacent knuckles, and a first shaft passes through the second pulley.

4. The robotic dexterous hand as defined in claim 3, wherein each of the actuators includes a shell and a first servo accommodated in the shell, each of the finger mechanisms further includes a first driven belt, the knuckle located on the other end of the finger opposite to the fixed knuckle is defined as a distal knuckle, the knuckle adjacent to the fixed knuckle is defined as a proximal knuckle, one end of the first driven belt is fixed to the distal knuckle, the other end extends successively from the distal knuckle along the other knuckles connecting to the distal knuckle until beyond the proximal knuckle, then passes through the connecting element into the shell of the actuator subsequently and connects with the first servo, the first servo drives the first driven belt to draw all the knuckles between the proximal knuckle and the distal knuckle to link with the distal knuckle.

5. The robotic dexterous hand as defined in claim 4, wherein the main body further includes a first hole and a second hole, the first hole and the second both communicate with the first accommodating space, the first driven belt traverses the first pulley located in the distal knuckle in a first direction, then passes through the first hole of the main body of the distal knuckle, after traversing the second pulley located between the distal knuckle and the other knuckle connecting with the distal knuckle in the first direction, the first driven belt enters the first accommodation space of the main body from the second hole of the main body of the other knuckle, the first driven belt traverses the first pulley of the other knuckle in a second direction, then passes through the first hole of the main body of another knuckle, after traversing the second pulley between the other knuckle and the proximal knuckle, the first driven belt enters the first accommodation space of the main body from the second hole of the main body of the proximal knuckle and traverses the first pulley located in the proximal knuckle in the first direction, wherein the first direction is opposite to the second direction.

6. The robotic dexterous hand as defined in claim 4, wherein each of the finger mechanisms further includes a first spring tube, one end of the first spring tube is inserted into the proximal knuckle, the other end of the first spring tube passes through the connecting element and enters the shell of the actuator, the portion of the first driven belt having the same path as the first spring tube is received in the first spring tube, the first spring tube guides the extension path of the first driven belt.

7. The robotic dexterous hand as defined in claim 6, wherein an outlet is defined on the main body of each knuckle, the outlet communicates with the first accommodation space of the main body, the outlet extends obliquely with respect to a knuckle shell, the first spring tube is inserted into the outlet of the proximal knuckle.

8. The robotic dexterous hand as defined in claim 6, wherein the portion of the first spring tube coinciding with the actuator is pre-embedded in the shell of the actuator.

9. The robotic dexterous hand as defined in claim 6, wherein the finger of each of the finger mechanisms further includes a guiding plate, the guiding plate is defined on the exterior of the shell of the actuator, the outer surface of the guiding plate is inclined with respect to the corresponding shell of the actuator, the first spring tube abuts against the outer surface of the guiding plate and extends into the shell of the actuator along the inclined direction of the guiding plate.

10. The robotic dexterous hand as defined in claim 9, wherein the guiding plate includes a first inclined surface, the distance between the first inclined surface and the corresponding shell of the actuator gradually decrease along the extension path of the first spring tube into the actuator, the first spring tube abuts against the first inclined surface.

11. The robotic dexterous hand as defined in claim 9, wherein the guiding plate includes a first inclined surface and a second inclined surface intersecting with the first inclined surface, the distance between the first inclined surface and the corresponding shell of the actuator and the distance between the second inclined surface and the corresponding shell of the actuator gradually decrease along the extension path of the first spring tube into the actuator, the first spring tube abuts against the first inclined surface or the second inclined surface.

12. The robotic dexterous hand as defined in claim 4, wherein the actuator further includes a second servo defined in the shell, each of the finger mechanisms further includes a second driven belt, one end of the second driven belt is fixed to the proximal knuckle, the other end passes through the fixed knuckle and extends beyond the fixed knuckle, the second driven belt passes through the connecting element into the shell of the actuator subsequently and connects with the second servo, the second servo drives the second driven belt to draw the proximal knuckle to move relative to the fixed knuckle.

13. The robotic dexterous hand as defined in claim 12, wherein each of the finger mechanisms further includes a second spring tube, the fixed knuckle includes an outlet communicating with the first accommodating space of the main body, one end of the second spring tube is inserted in to the outlet of the fixed knuckle, the other end passes through the connecting element and enters the shell of the actuator, the portion of the second driven belt having the same path as the second spring tube is received in the second spring tube, the second spring tube guides the extension path of the second driven belt.

14. The robotic dexterous hand as defined in claim 13, wherein the portion of the second spring tube coinciding with the actuator is pre-embedded in the shell of the actuator.

15. The robotic dexterous hand as defined in claim 1, wherein the actuator is provided with a T-shape slot, the connecting element is locked into the T-shape slot and fixed with the actuator.

16. The robotic dexterous hand as defined in claim 1, wherein further includes a base, a vision sensing module, the finger mechanisms and the vision sensing module are both positioned on the base, the multiple finger mechanisms perform the gripping of the object according to the identification and location by the vision sensing module.

17. The robotic dexterous hand as defined in claim 1, wherein further includes a suction mounting module, the suction mounting module is positioned on the actuator of one of the finger mechanisms, the suction mounting module is used for mounting a sucker.

* * * * *